(No Model.)
2 Sheets—Sheet 2.
J. DU BOIS.
LOCK AND DAM.
No. 251,771. Patented Jan. 3, 1882.
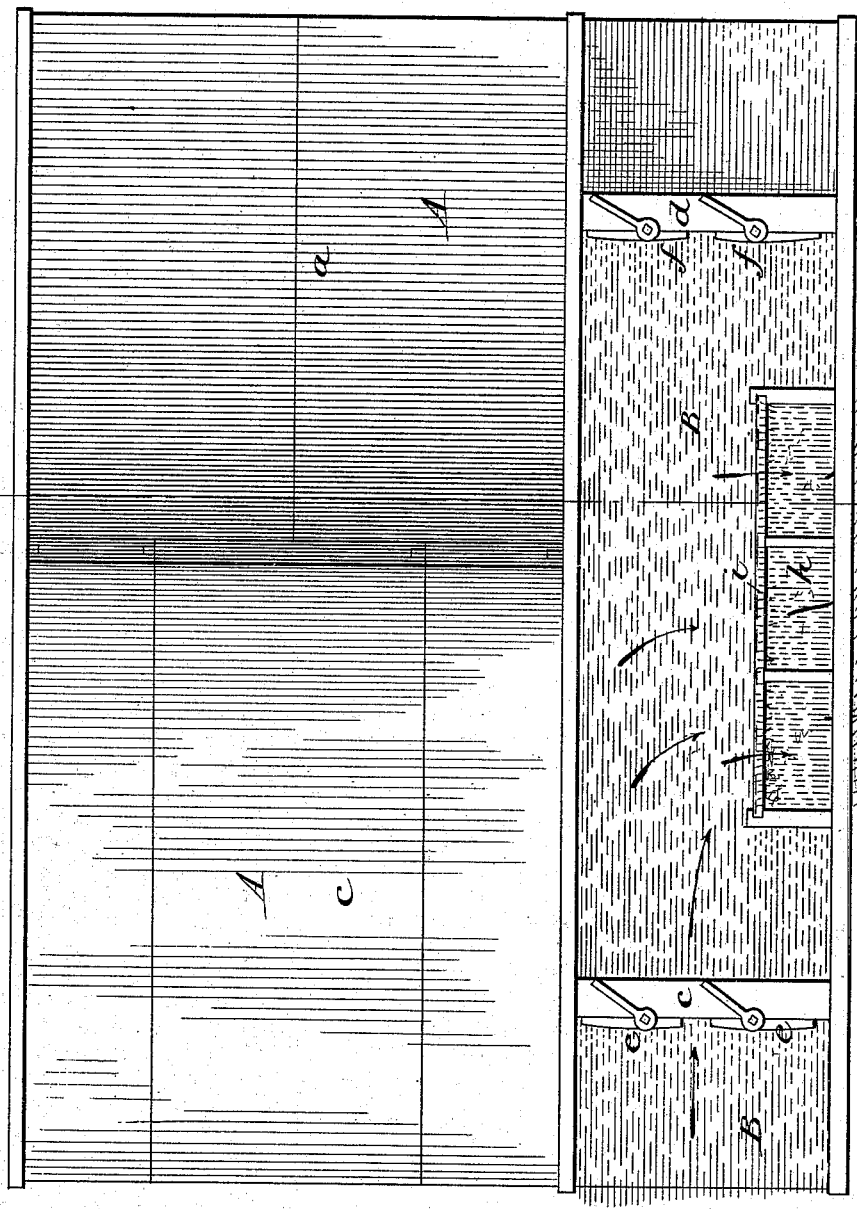

UNITED STATES PATENT OFFICE.

JOHN DU BOIS, OF DU BOIS, PENNSYLVANIA.

LOCK AND DAM.

SPECIFICATION forming part of Letters Patent No. 251,771, dated January 3, 1882.

Application filed November 11, 1881. (No model.)

*To all whom it may concern:*

Be it known that I, JOHN DU BOIS, of Du Bois, in the county of Clearfield and State of Pennsylvania, have invented certain Improvements in Locks and Dams, of which the following is a specification.

My present invention relates to improvements designed more particularly for use in connection with that system of dams and locks represented in Letters Patent, heretofore granted to me, Nos. 229,682 and 236,488.

The objects of the present invention are, first, to prevent the flexible gates or dam-sections from being subjected to an excessive or dangerous pressure of water from beneath; and, second, to permit the dam to adjust itself to slight variations or irregularities in the foundation, and to prevent the leakage of water past and between the various sections of which the lock or dam may be composed.

The first part of my invention (for limiting water-pressure beneath the gate or dam) consists in the use of an overflow or discharge opening arranged in the flume or supply-chamber in advance of the gate or dam, and at such height as to permit the escape of the water past the gate, without entering beneath the same, whenever the desired limit of pressure is reached. My invention in this regard is restricted to an arrangement wherein the head of the water is regulated before it passes beneath the gate or dam, as contradistinguished from a system wherein the water is first passed beneath the dam or gate and then permitted to escape through a safety-outlet. By limiting the head of the water previous to its passage beneath the gates I am enabled to secure better results and to make use of a much more simple construction than is required when the water is first passed beneath the gate and then permitted to seek a safety-outlet.

The second part of the invention consists in a flexible dam consisting of hinged overlapping leaves, each leaf composed of a series of sections arranged side by side, said sections being provided, when required, with packing in the adjacent edges.

Referring to the drawings, Figure 1 is a longitudinal vertical section through a gate constructed on my plan. Fig. 2 is a top plan view of the same. Fig. 3 is a cross-section on the line $x\,x$, Fig. 2.

A represents my dam or gate, consisting of leaves or sections $a$, $b$, and $c$, connected and arranged, as in my previous patent, so that they may be raised and lowered at their inner end, the elevation being effected by the admission of water into the space or chamber beneath the gate, in order to force the same upward. Under the construction represented in my previous patents a possibility existed of the gates being subjected to an excessive and dangerous pressure in the event of the water above the dam attaining an excessively high head or elevation. In order to avoid this danger, I now provide the flume B, through which the water is introduced to and discharged from the space beneath the gate, with transverse bulk-heads $c\,d$, containing gates or wickets $e\,f$, serving respectively to control the admission or passage of water to and from the gate. Water being admitted beneath the gate elevates the same, and at the same time rises within the flume or supply-chamber above the lower bulk-head, $d$, the gates $f$ being closed to maintain a limited head of water beneath the gate. In the supply-chamber B, in advance of or above the bulk-head $d$, I form a lateral discharge or overflow chamber, $h$, through the top of which the water may escape from the flume or supply-chamber whenever the fixed limit of elevation is attained.

The inner side of the discharge or overflow chamber $h$, from which the water flows to escape, is composed of a series of planks, $i$, seated one upon another in grooves in the frame. By adding planks to or removing them from the series the height of the overflow-wall may be increased or diminished to any extent desired, and in this way the elevation of the water, and the consequent elevation of the dam, may be fixed at any point, it being manifest that as soon as the water reaches an elevation at which it can escape from the chamber $h$ the elevation of the dam will cease. Thus it will be seen the head of the water is regulated previous to its reaching the gate, preventing the possibility of the latter receiving an excessive strain.

It will be observed that under my system of construction the surplus water, instead of passing beneath the gate to be discharged, escapes directly through the flume, past the gate, without entering thereunder.

I am aware that an attempt has been made

UNITED STATES PATENT OFFICE.

JOHN ECKART, OF MUNICH, BAVARIA, GERMANY.

COMPOUND FOR PRESERVING MEATS AND FISH.

SPECIFICATION forming part of Letters Patent No. 251,772, dated January 3, 1882.

Application filed November 18, 1880. (Specimens.)

*To all whom it may concern:*

Be it known that I, JOHN ECKART, of Munich, Kingdom of Bavaria, Germany, have invented a certain new and useful Preserving Compound, of which the following is a specification.

Instead of the solution mentioned in my United States Patent No. 194,550, dated August 28, 1877, in which a half-pound of salicylic acid in one hundred pounds of water was used for preserving animal or vegetable matter, I use the following preserving-salt, consisting of a mixture of fifty per cent. of common salt, forty-seven and one-half per cent. of chemically pure boracic acid, two per cent. of tartaric acid, one-half per cent. of salicylic acid. This salt is applicable to preserving any sort of meats for food, but particularly so for fish. The flesh of fishes immediately after they are caught is separated from the skin and bones. I mix the flesh with my preserving-salt in the proportions of about twenty grams of the salt with one kilogram of flesh. The flesh is afterward filled into gut or artificial cases of parchment or other flexible material. These flexible cases are then packed or filled into casks or other vessels, after which these casks are filled up with a gelatine solution, made in the proportion of about fifty grams of gelatine, twenty grams of the preserving-salt, and one thousand grams of water, and submitted to a pressure in the following manner: The casks being strong and tight, their interior is put in communication with the pressure-pipe of a pump and hermetically closed, more of the solution is pumped into the cask until the pressure-gage with which it is supplied shows a pressure up to twelve atmospheres or more. This presure is maintained from fifteen to thirty minutes, more or less, according to the requirements of the case, until the contents are completely saturated. Then an air-valve is opened and the pressure relieved, and the cover removed and the contents taken out. The gut or cases may then be strewn over with more of the salt in a dry condition and stored in vessels for shipment, and may be covered with a solution of the preserving-salt in water.

By this method of packing the flesh of fish or other substances they are thoroughly saturated and the air is entirely excluded therefrom under all circumstances during the storage in the vessels and transportation.

I call such fish, preserved, filled, and packed in the manner described, "rolled" fish.

Other meats may be treated in a similar way, and the effect will be as satisfactory.

I do not herein claim the gelatine solution, as I propose to make it the subject of a separate application for patent.

Modifications may be made in the proportions to a limited extent. Parts of the invention may be used without the others. I can omit the packing in gut. I can omit the addition of gelatine; but I prefer the whole used together.

I am aware that salt and the acids named herein have been used as preservatives separately and in other combinations, and I do not claim them except as herein set forth.

I claim—

1. The preserving-salt composed of chloride of sodium and boracic acid with the smaller quantities of tartaric and salicylic acid, substantially as herein specified.

2. The sausage described, having a filling of meat saturated with the preserving-solution, as herein specified.

In testimony whereof I have hereunto set my hand.

JOHN ECKART.

Witnesses:
WILHELM WIESENHÜTTER,
MARTIN KÖRNER.